United States Patent [19]

Riccitelli et al.

[11] Patent Number: 5,525,110
[45] Date of Patent: Jun. 11, 1996

[54] UNIVERSAL JOINT

[75] Inventors: Martin G. Riccitelli, Westfield, Mass.; Frederick W. Mitchell, III, Torrington, Conn.; William E. Korzan, Bethlehem, Conn.; David E. Boyden, Granby, Conn.

[73] Assignee: The Torrington Company, Torrington, Conn.

[21] Appl. No.: 146,379

[22] Filed: Oct. 29, 1993

[51] Int. Cl.⁶ .................................................. F16D 3/33
[52] U.S. Cl. ............................................ 464/118; 464/125
[58] Field of Search ................................. 464/117, 118, 464/114, 162, 905, 125, 128, 130

[56] References Cited

U.S. PATENT DOCUMENTS

| | | | |
|---|---|---|---|
| 1,898,265 | 2/1933 | Ragan | 464/114 |
| 1,911,214 | 5/1933 | Van Ranst . | |
| 2,609,673 | 9/1952 | Butterfield | 464/114 |
| 3,028,766 | 4/1962 | Musilli | 464/117 X |
| 3,029,618 | 4/1962 | Bouchard et al. . | |
| 3,159,013 | 12/1964 | Mazziotti | 464/905 |
| 3,165,942 | 1/1965 | Steiner et al. . | |
| 3,319,439 | 5/1967 | Hopf et al. | 464/117 |
| 4,121,437 | 10/1978 | Michel | 464/125 |
| 4,207,757 | 6/1980 | Onuma | 464/118 |
| 4,395,246 | 7/1983 | Taig et al. | 464/153 |
| 4,436,515 | 3/1984 | Mallet | 464/905 |
| 4,533,949 | 11/1985 | Parks et al. | 464/153 |
| 5,094,651 | 3/1992 | Cornay | 464/12 |
| 5,415,588 | 5/1995 | Wier | 464/114 |

FOREIGN PATENT DOCUMENTS

| | | | |
|---|---|---|---|
| 0560058A2 | 9/1983 | European Pat. Off. . | |
| 93634 | 11/1983 | European Pat. Off. | 464/117 |
| 0266255 | 5/1988 | European Pat. Off. . | |
| 717790 | 1/1932 | France . | |
| 1156470 | 5/1958 | France . | |
| 1486469 | 6/1967 | France . | |
| 2402803B1 | 4/1979 | France . | |
| 2526101B1 | 11/1983 | France . | |
| 664786 | 8/1938 | Germany . | |
| 1190363 | 12/1965 | Germany . | |
| 3921242C1 | 6/1990 | Germany . | |
| 4207218 | 9/1993 | Germany | 464/118 |
| 303015 | 1/1955 | Switzerland . | |
| 360551 | 4/1962 | Switzerland . | |
| 1581904 | 7/1990 | U.S.S.R. | 464/119 |
| 347315 | 4/1931 | United Kingdom . | |
| 377760 | 8/1932 | United Kingdom . | |
| 475455 | 11/1937 | United Kingdom . | |
| 994696 | 6/1965 | United Kingdom | 464/114 |

*Primary Examiner*—Daniel P. Stodola
*Assistant Examiner*—Eileen A. Dunn
*Attorney, Agent, or Firm*—Michael H. Minns

[57] ABSTRACT

A double cardan universal joint having a pair of annular ring yokes pivotally connected by a tubular coupling yoke. Specific examples are provided of using the double cardan universal joint as a non-constant velocity joint in a three universal joint steering system whereby a the three universal joint system operates at constant velocity.

27 Claims, 9 Drawing Sheets

UNIVERSAL JOINT

BACKGROUND OF THE INVENTION

This invention relates generally to universal joints and more particularly to trunnion pin double Cardan universal joints.

The parameters of a well designed vehicle steering system include a consistent torque effort at the steering wheel, a crisp and symmetric return to the straight ahead position, and a pleasing on-center feel. Historically, these features were more easily attained with a straight-line placement of the steering column relative to the gear connection.

The trend toward vehicle downsizing, along with new vehicle requirements for crush zones and tighter package restraints, have necessitated the incorporation of multiple universal joint steering systems, thus making the features of a well designed steering system more difficult to obtain. Moreover, operating angles continue to increase with the reduction of packaging space and imposed government motor vehicle safety standards.

The foregoing illustrates limitations known to exist in present universal joints. Thus, it is apparent that it would be advantageous to provide an alternative directed at overcoming one or more of the limitations set forth above. Accordingly, a suitable alternative is provided, including features more fully disclosed hereinafter.

SUMMARY OF THE INVENTION

In one aspect of the present invention, this is accomplished by providing a universal joint comprising: a tubular housing; two annular ring yokes pivotally mounted to the tubular housing; a first shaft section pivotally mounted to one annular ring yoke; and a second shaft section pivotally mounted to the other annular ring yoke; the axis of pivot of an annular ring yoke being at right angles to the axis of pivot of the corresponding shaft section, the shaft sections being interengaged by a ball and socket assembly.

The foregoing and other aspects will become apparent from the following detailed description of the invention when considered in conjunction with the accompanying drawing figures.

DETAILED DESCRIPTION

The present invention is a small diameter, simplified double Cardan universal joint that, unlike multiple joint, high angle, single Cardan universal joint systems, can transmit rotational motion at near constant velocity, resulting in little or no torque variation, thus approximating the performance of less complex systems of years past.

Figure 4:
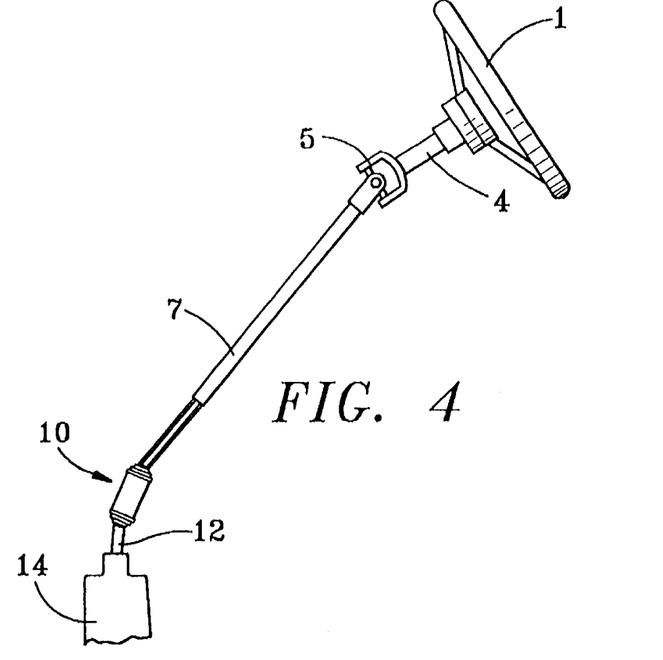
FIG. 4 is a perspective view of a steering shaft incorporating the double Cardan universal joint shown in FIG. 1.

Shown in FIG. 4 is a typically steering system. A steering wheel 1 is connected to an upper shaft 4 which is connected by a single Cardan universal joint 5 to a middle shaft 7. A double Cardan universal joint 10 incorporating the present invention connects the middle shaft 7 to a lower shaft 12. The lower shaft 12 is then connected to a steering gear box 14.

Figure 1:
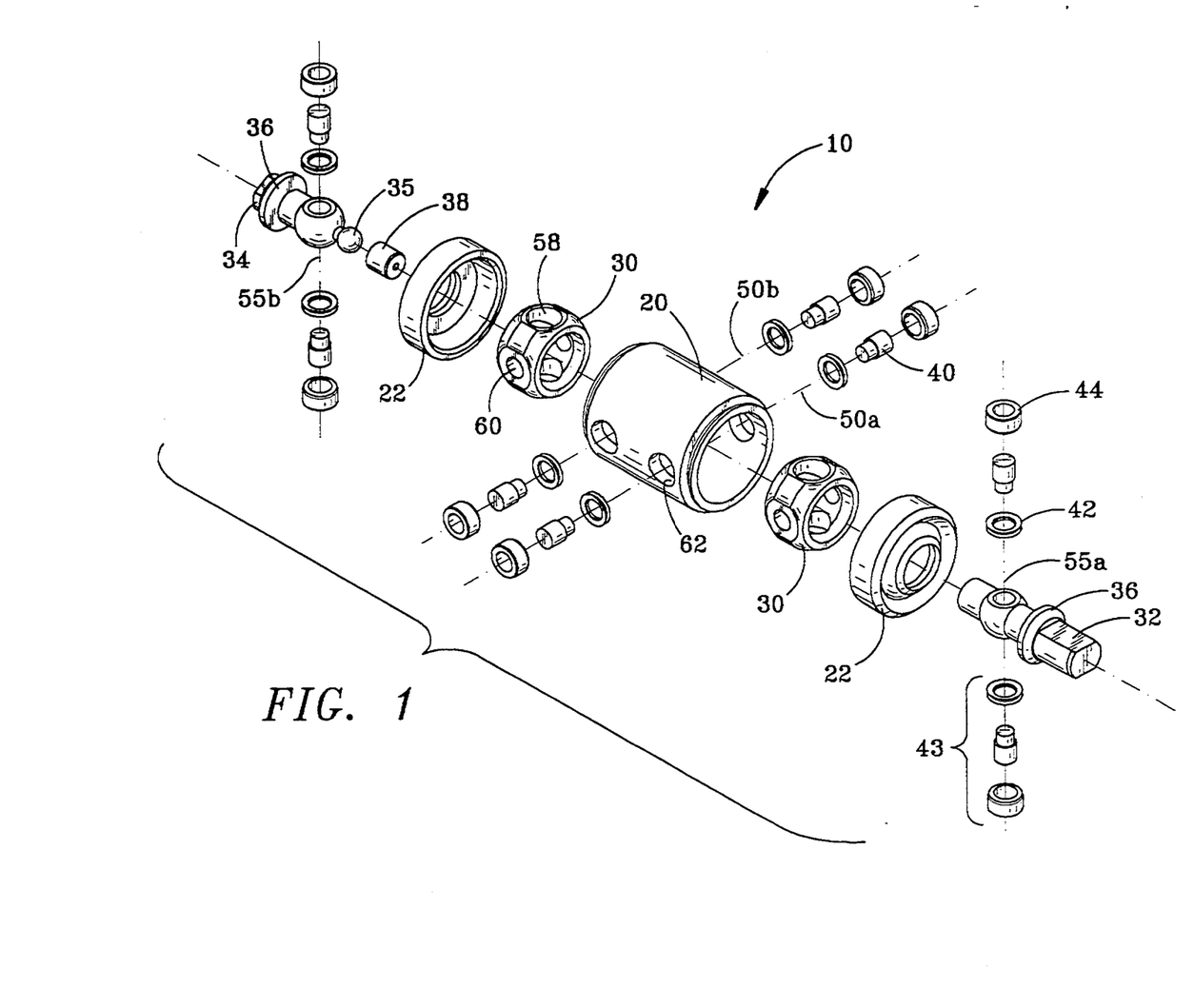
FIG. 1 is an exploded perspective view of a tubular housing and annular ring yoke double Cardan universal joint.

FIG. 1 shows an exploded perspective view of a universal joint incorporating the present invention. Shown is a trunnion pin type double Cardan universal joint 10. A circular annular cross ring 30 is used in place of the typical Cardan cross yoke. A tubular housing 20 is used in place of the typical Cardan coupling yoke. The use of the tubular housing 20 and the pair of circular annular cross rings 30 reduces the outer dimensions of the double Cardan universal joint 10 and simplifies manufacturing, thereby reducing cost.

The double Cardan universal joint 10 is used to pivotally connect two shafts 7, 12. One shaft 7 has a shaft socket extension 32 attached to its end. The shaft socket extension 32 has a ball socket 33 in its free end. The other shaft 12 has a shaft ball extension 34 attached to its end. The shaft ball extension 34 has a centering ball 35 integral with its free end. Both shaft extensions 32, 34 have pin receiving apertures 56 therethrough.

Each shaft extension 32, 34 is pivotally connected to a circular annular cross ring 30. In the embodiment shown in FIGS. 1 through 3, the axes of pivot 55a, 55b of the shaft extensions 32, 34 are parallel. In the alternate embodiment shown in FIG. 6, one axis of pivot 55a is rotated 90° to the other axis of pivot 55b. The axes of pivot of the shaft extensions 32, 34 may be orientated respectively to one another at any angle between 0° and 90°, inclusive, as shown in FIG. 7.

Each cross ring 30 is a tubular like annular ring having a pair of opposed pin receiving apertures 60 therethrough and a pair of opposed bearing receiving apertures 58 therethrough. Each shaft extension 32, 34 is pivotally connected to a cross ring 30 by a pair of trunnions 43. Each trunnion 43 is comprised of a trunnion pin 40, a bearing 44 and a thrust collar 42. A pair of trunnion pins 40 are fixedly inserted into the shaft pin receiving apertures 56. A bearing 44, preferably a drawn cup needle bearing, is placed over an enlarged diameter portion of trunnion pin 40. The outer portion of bearing 44 is received within the cross ring bearing receiving apertures 58. The bearing 44 may be secured to the cross ring 30 by any of a number of known methods, such as staking. The thrust collar 42 is interposed between the shaft extension 32, 34 and the cross ring 30. The thrust collar 42 transfers thrust loads between the shaft extensions 32, 34 and the bearing 44 housing.

Without the thrust collars 42, thrust loads may be imposed on the bearing 44 internals which can cause premature bearing failure. Preferably, the thrust collar 42 is formed of a self-lubricating bearing material containing a lubricant such as molybdenum disulfide.

The circular annular cross rings 30 are pivotally connected to a cylindrical tubular housing 20. The tubular housing 20 has two pair of spaced apart opposed bearing receiving apertures 62 therethrough. Each cross ring 30 is pivotally connected to the tubular housing 20 by a pair of trunnions 43. The trunnions 43 pivotally connect the circular annular cross rings 30 to the tubular housing 20 in the manner described above for the pivotal connection of the shaft extensions 32, 34 to the circular annular cross rings 30.

The axis of pivot 50a, 50b of each cross ring 30 is at a 90° angle to the axis of pivot 55a, 55b, respectively, of each shaft extension 32, 34. For the embodiment shown in FIGS. 1 through 3, the axes of pivot 50a and 50b are parallel.

The double Cardan universal joint 10 is sealed by external perimeter boot seals 22 located at the ends of the cylindrical tubular housing 20. These boot seals 22 prevent debris and fluids from entering and possibly damaging the centering mechanism 37. The need for a separate centering device seal is eliminated. The boot seals 22 must be able to absorb both angular and torsional displacements.

As in other double Cardan universal joints, the present invention includes a centering mechanism 37, which is comprised of a centering ball 35 integral with shaft extension 34 and a corresponding socket 33 integral with shaft extension 32. With the centering mechanism 37 formed of components integral with the shaft extensions 32, 34, the problems with fit typically found in ball and shaft stud arrangements are eliminated. The rotational clearance of the double Cardan universal joint is also reduced with this integral configuration. The socket 33 can be simply a bore machined into the end of shaft extension 32. An interface sleeve 38 is positioned with the socket 33 to support the ball 35 and allow the ball 35 to move axially relative to the socket 33 during joint angular changes. The interface sleeve 38 is cylindrical in design and can be made from a variety of materials and processes depending upon the contact stresses encountered in the centering mechanism 37. Preferably, the interface sleeve 38 is formed of a self-lubricating bearing material containing a lubricant such as molybdenum disulfide. The integral shaft/centering mechanism design allows centerline distance between the cross ring pivot axes 50a, 50b to be minimized. This results in a reduction of the double Cardan universal joint 10 diametral and axial dimensions, when compared to a conventional double Cardan universal joint design.

Figure 5:
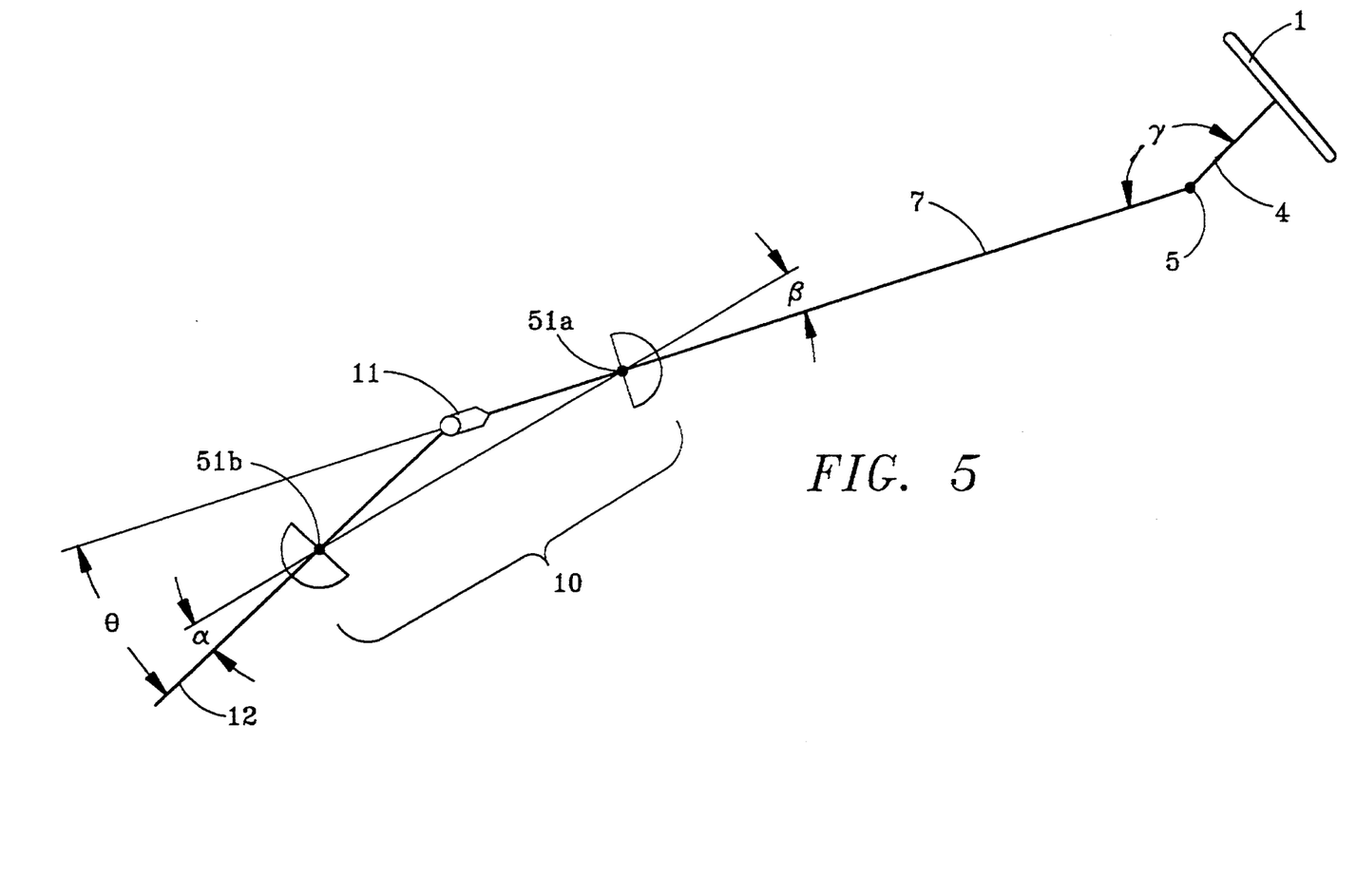
FIG. 5 is a schematic representation of the steering shaft shown in FIG. 4, illustrating the angle relationships between the component shafts.

The centering mechanism 37 forces the intersection of the centerlines of the shaft extensions 32, 34 (and the corresponding shafts 7, 12), as shown schematically in FIG. 5. This type of constant velocity double Cardan universal joint operates at true constant velocity in only two positions. The first is the degenerate case of zero degrees operating angle. The second is the design operating angle θ, which is a function of the axial position of the fixed portion of the centering mechanism 37 with respect to one of the two individual joints (which make up the double Cardan universal joint). To illustrate this point, a double Cardan universal joint, operating as a true constant velocity at a 40° operating angle would have its centering mechanism positioned such that the center point 11 and the two individual U-joints pivot points 51a, 51b would form a perfect isosceles triangle. The two equal angles, α and β, would be exactly 20°. In this condition, the output velocity of the double Cardan universal joint exactly equals the input velocity of the double Cardan universal joint. The nominal design operating angle for the present double Cardan universal joint is 40°.

Figure 11:
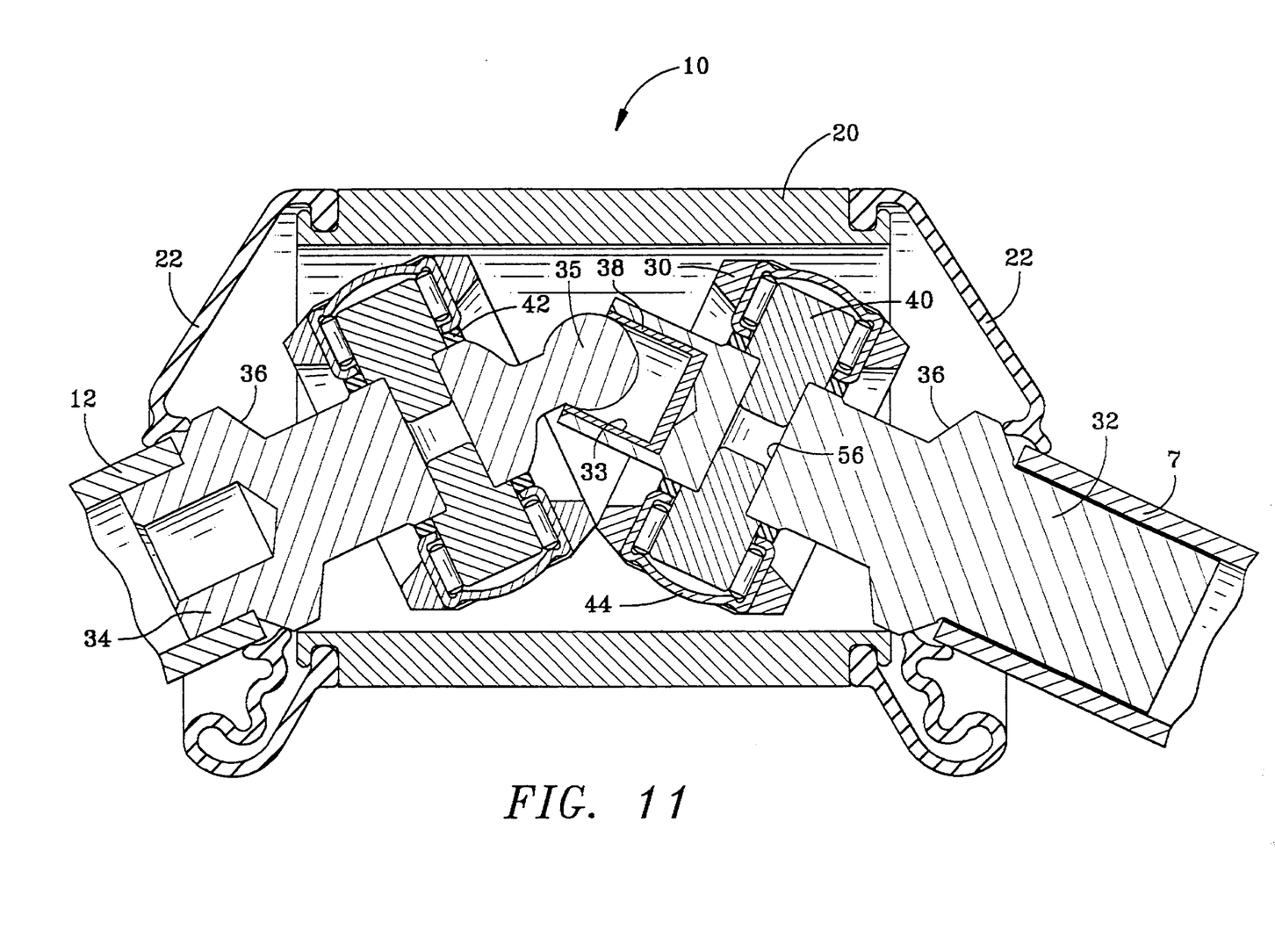
FIG. 11 is an alternate view of the cross-section shown in FIG. 3, showing the double Cardan universal joint with shaft connections pivoted.

A plurality of mechanisms are provided to prevent the maximum angle of the two shafts 7, 12 from exceeding the angle at which the ball 35 will disengage from the socket 33. The first maximum angle mechanism is a stop ring 36 provided on each shaft extension 32, 34. The diameter of the stop ring 36 is designed such that the stop ring 36 will engage the tubular housing 20 prior to the ball 35 disengaging from the socket 33. The second maximum angle mechanism comprises the shaft portion of the shaft extensions 32, 34 adjacent the stop ring 36 engaging the circular annular cross rings 30 prior to the ball 35 disengaging from the socket 33. The third maximum angle mechanism comprises the circular annular cross rings 30 engaging one another prior to the ball 35 disengaging from the socket 33. FIG. 11 shows the circular annular cross rings 30 engaging one another. Preferably, for a double Cardan universal joint 10 with a nominal operating angle of 40°, the maximum allowed angle is 50°.

If the center point 11 were placed elsewhere, the double Cardan universal joint could still be positioned to operate at 40°, but the individual joint angles would each be slightly above and slightly below 20° respectively, giving an error in true constant velocity motion, i.e., the instantaneous output velocity would not remain numerically equal to the input velocity. The double Cardan universal joint would have a small equivalent operating angle. Where the axes of pivot 50a, 50b for the individual u-joints are parallel, the equivalent operating angle Φ for the double Cardan universal joint is determined by: $\Phi = \sqrt{\alpha^2 - \beta^2}$. The angle α is arbitrarily selected as the numerically greater of the two double Cardan universal joint half angles to avoid taking the square root of a negative quantity.

This phenomenon, as a result of deliberately moving the centering point 11 of the double Cardan universal joint, can be applied to advantage when the double Cardan universal joint 10 is used in conjunction with another joint 5 of single Cardan universal joint configuration. A system with a true constant velocity joint at one end and a conventional single Cardan universal joint operating at some angle γ at the other end will by necessity have an equivalent angle equal in magnitude to that of the single Cardan universal joint 5, that is γ. In other words, the true constant velocity joint, operating at its own internal equivalent angle of zero degrees, can not be phased to subtract algebraically from the operating angle of the other single Cardan universal joint.

However, repositioning the centering mechanism 37 away from its "correct" position forces the double Cardan universal joint 10 to operate at a non-constant velocity. Therefore, a double Cardan universal joint can be deliberately designed to operate at a small equivalent angle which can then be phased to subtract from the other joint angle, thereby reducing or eliminating the overall system equivalent angle. This could be especially useful in a system where one of the operating angles is greater than approximately 35°, thus requiring a constant velocity joint, while the second joint operates at a high enough angle that it by itself could cause marginally "lumpy" steering.

For a steering system such as that shown in FIGS. 4 and 5, the minimum equivalent angle of the properly phased steering system is: $\Phi_{system}=\sqrt{|\Phi_1^2-\gamma_1^2|}$ where $\Phi_1$ is the equivalent angle of the double Cardan universal joint 10 and $\gamma$ is the angle of the single Cardan universal joint 5.

Figure 2:
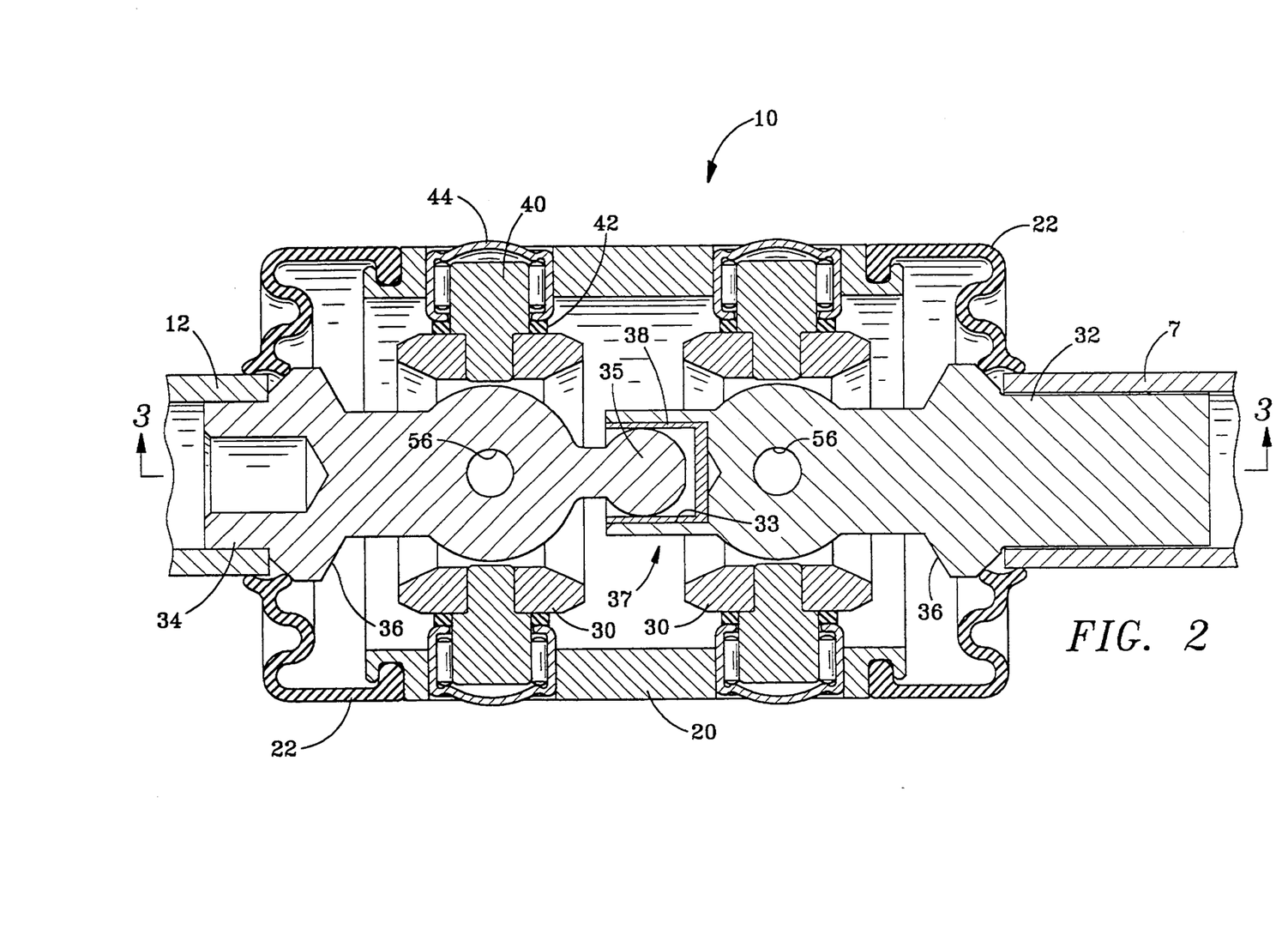
FIG. 2 is a cross-sectional view of the double Cardan universal joint shown in FIG. 1.
Figure 3:
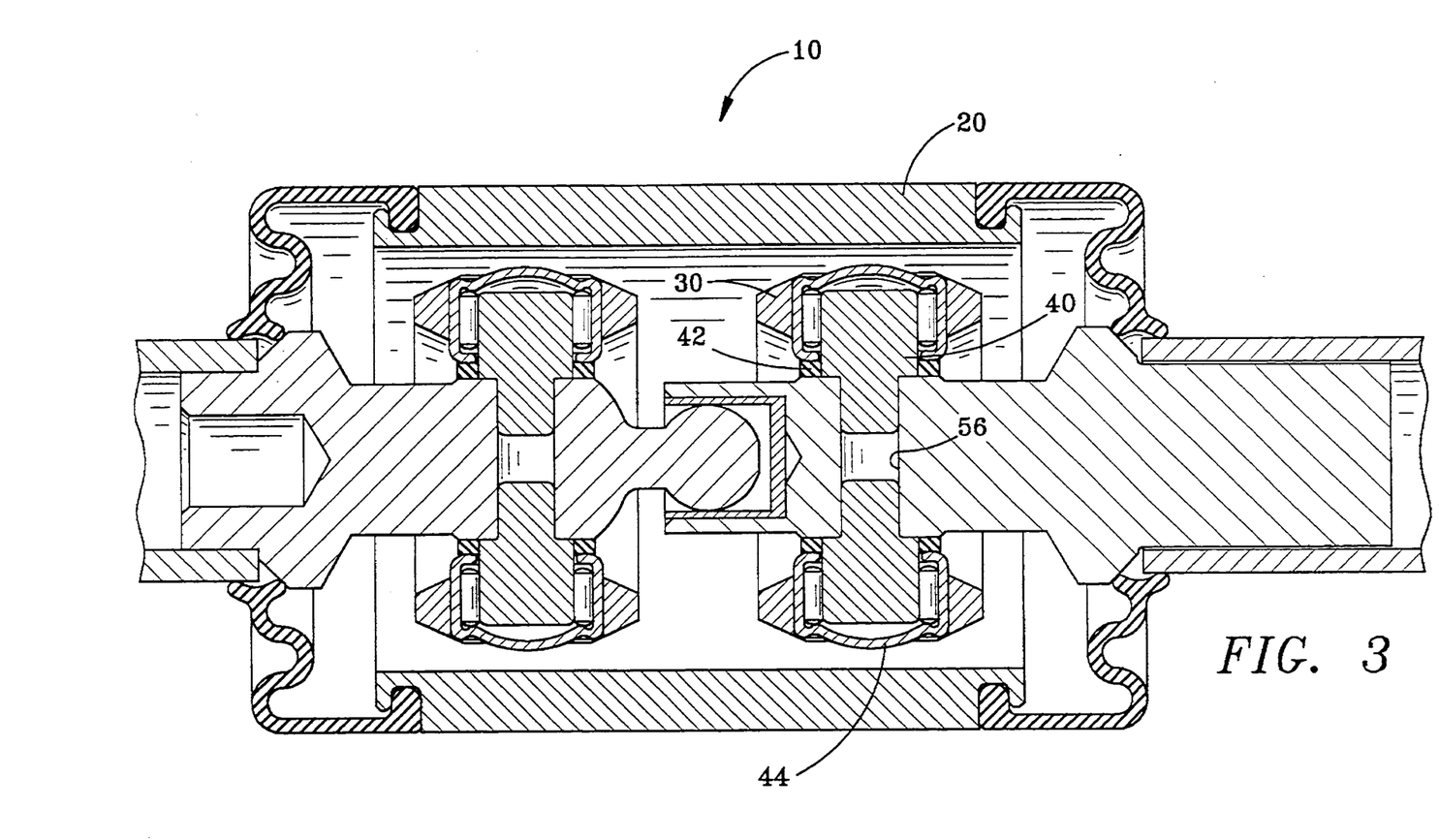
FIG. 3 is a cross-sectional view taken on line 3—3 of FIG. 2.

For an "in-phase" double Cardan universal joint, as shown in FIGS. 1 through 3, where the axes of pivot 50a, 50b of the circular annular cross rings 30 are parallel, the equivalent angle $\Phi$ is defined as $\Phi=\sqrt{\alpha^2-\beta^2}$. Due to dimensional limitations of physical hardware in the compact design of the present invention, the maximum equivalent angle which an in-phase double Cardan universal joint 10 with a shifted centering mechanism 37 can achieve is approximately 15°.

Figure 6:
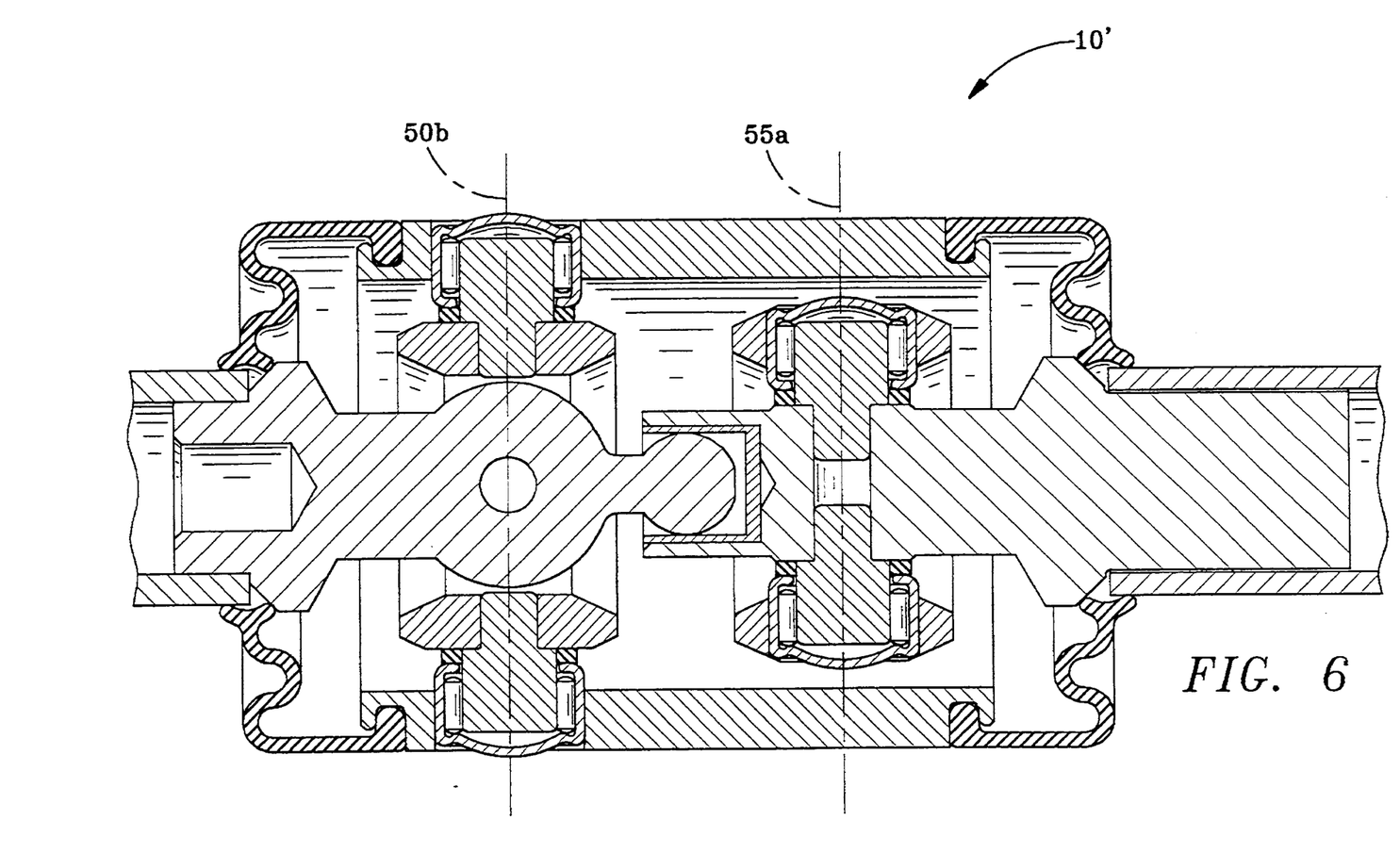
FIG. 6 is a cross-sectional view similar to FIG. 2 showing an alternate embodiment of the double Cardan universal joint.
Figure 7:
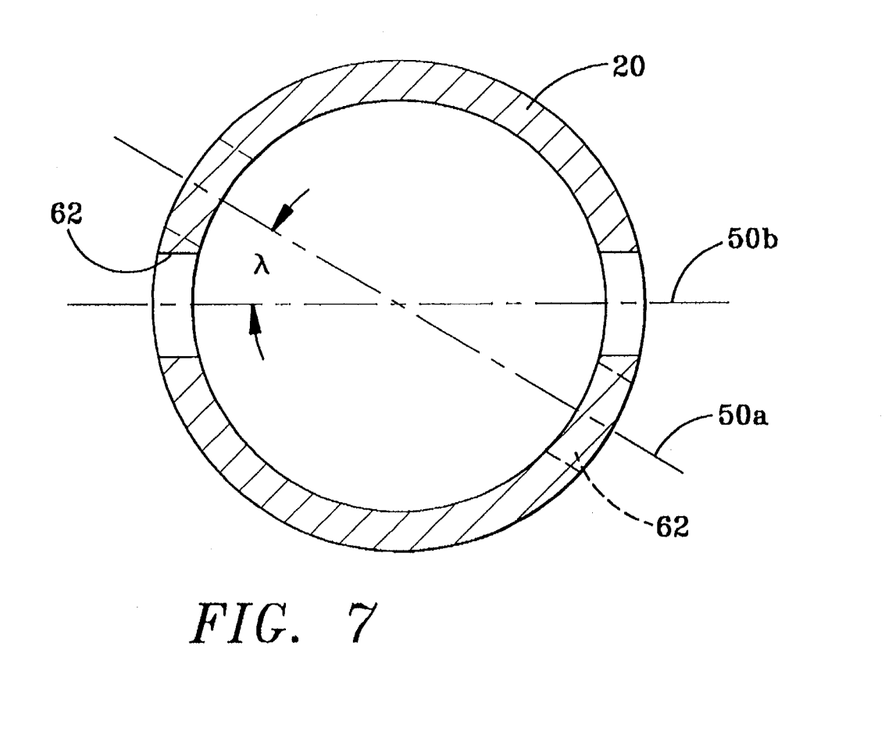
FIG. 7 is a cross-sectional view of the tubular housing of an alternate embodiment of the double Cardan universal joint.

For an "out of phase" double Cardan universal joint 10', as shown in FIG. 6, where the axes of pivot 50a, 50b of the circular annular cross rings 30 are perpendicular, the equivalent angle $\Phi$ is defined as $\Phi=\sqrt{\alpha^2+\beta^2}$. The maximum angle of the single Cardan universal joint which an out of phase double Cardan universal joint 10' operating with an internal total angle of 40° can totally compensate is approximately 28°.

Figure 10:
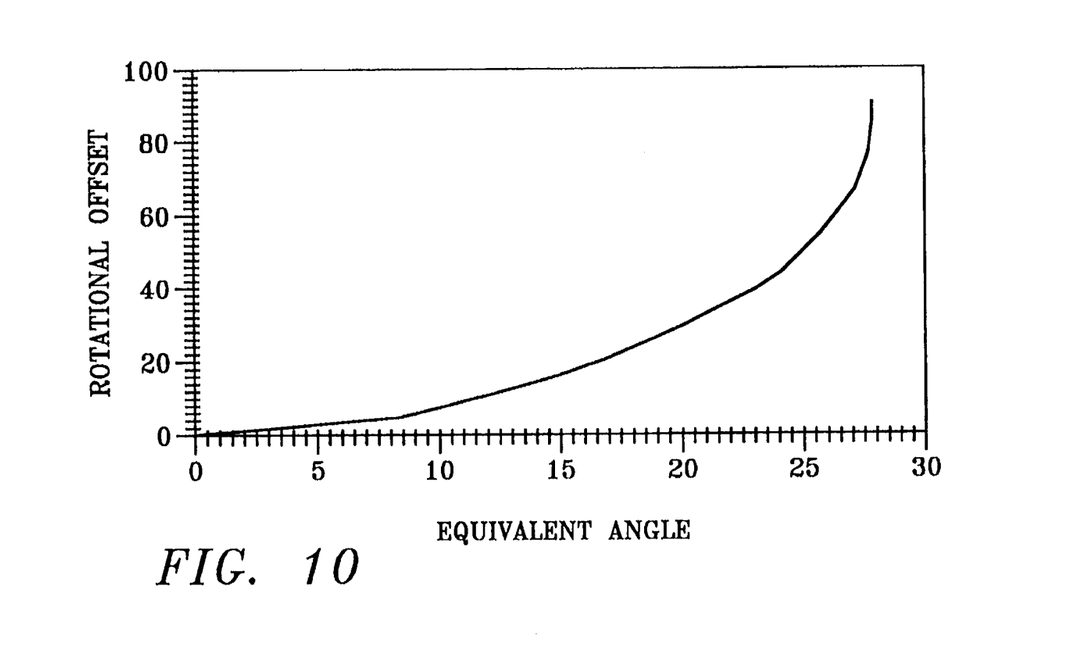
FIG. 10 is a graph correlating the rotational displacement of the individual universal joint axes to the equivalent angle of the double Cardan universal joint.

As an alternative to deliberating miscentering the centering mechanism 37, the cross ring pivot axes 50a, 50b, can be oriented relatively to one another at any angle between 0° and 90°. A double Cardan universal joint of the present invention operating with a total angle of 40° with the cross ring pivot axes 50a, 50b rotated between 0° and 90° will have an equivalent operating angle from 0° to 28°. FIG. 7 shows a tubular housing 20 with the cross ring pivot axes 50a, 50b rotated 25° relative to one another. FIG. 10 shows the relationship between the rotational offset of the cross ring pivot axes 50a, 50b and the resulting equivalent operating angle for a double Cardan universal joint of the present invention having a design operating angle of 40°.

For example, in a three joint steering system as shown in FIGS. 4 and 5, if the angle of the single Cardan universal joint 5 is 17° and the actual angle of a constant velocity double Cardan universal joint 10 is 40°, the equivalent angle $\Phi_{system}$ of the three joint system is 17°. If the cross ring pivot axes 50a, 50b are oriented 90° relative to one another, as shown in FIG. 6., the equivalent angle $\Phi_{system}$ of the three joint system is 22.6°. If the cross ring pivot axes 50a, 50b are oriented 21° to one another as shown in FIG. 7, the equivalent angle of the double Cardan universal joint 10 is approximately 16.9° and the equivalent angle $\Phi_{system}$ of the three joint system is approximately 1.8°. For an equivalent angle of 1.8°, the system velocity variation is essentially zero, resulting in a nearly constant velocity steering system.

Figure 8:
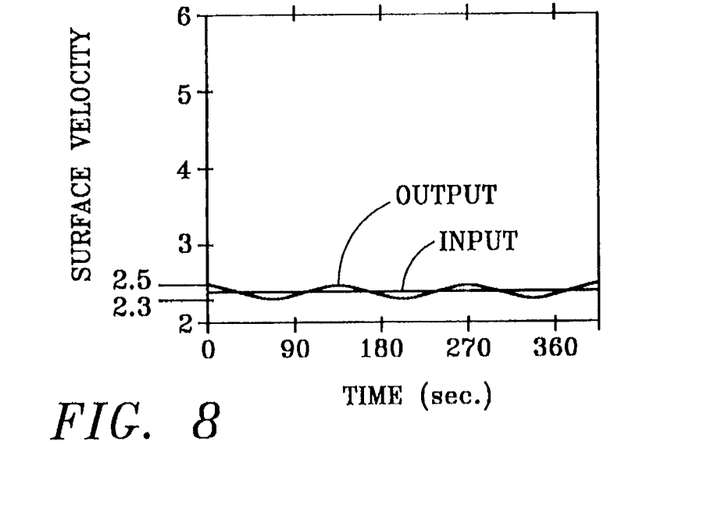
FIG. 8 is a graph of velocity versus time for a rotated axes double Cardan universal joint.
Figure 9:
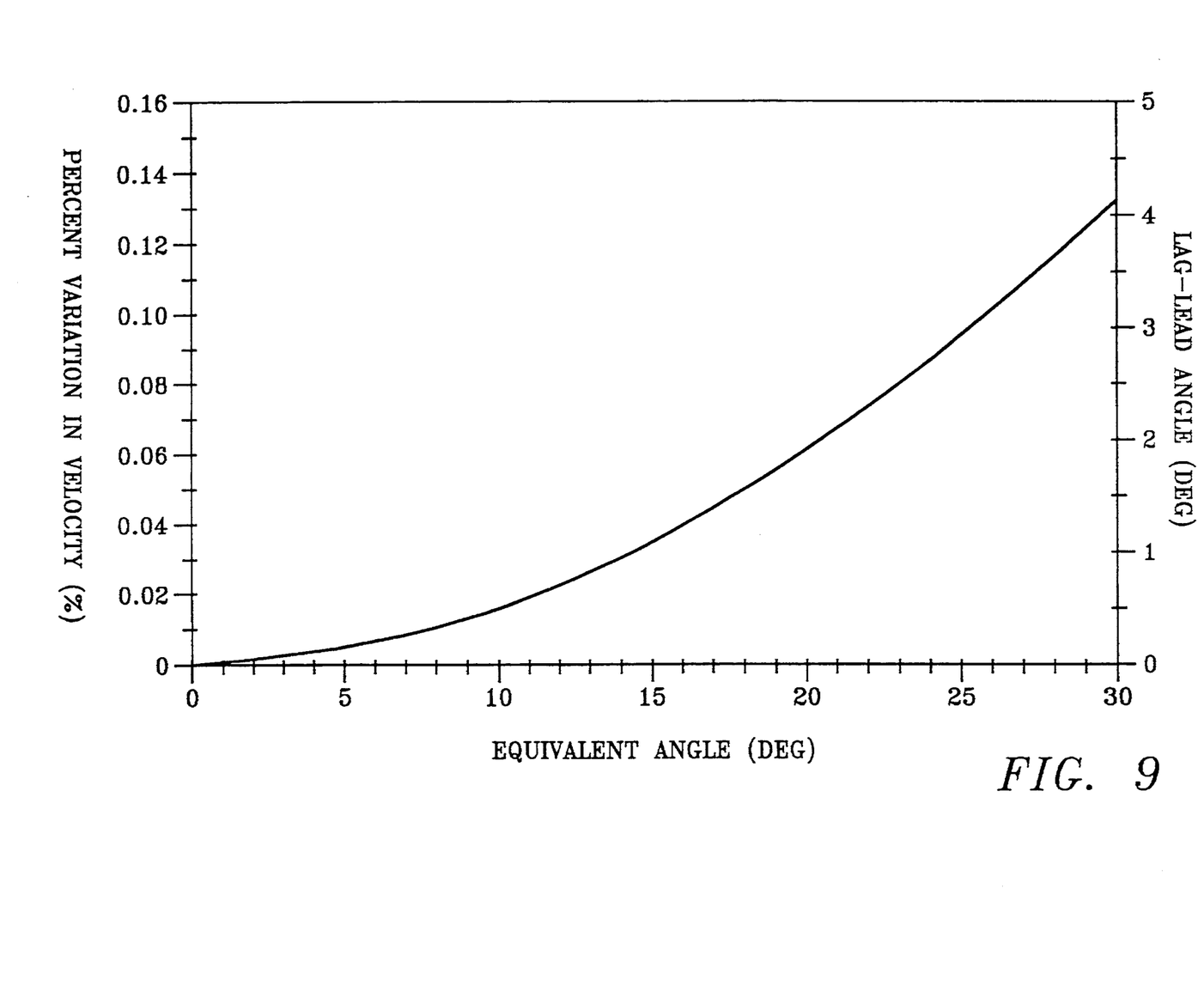
FIG. 9 is a graph correlating percent variation in velocity to equivalent angle.

One method of determining the equivalent angle of a double Cardan universal joint 10 having rotated cross ring axes 50a, 50b is to model the double Cardan universal joint using a computational modeling system such as an Aries Solids Modeling with Mechanisms to determine the velocity versus time at a specific angle. FIG. 8 shows the velocity variation for a double Cardan universal joint with an actual operating angle of 40° with the cross ring axes 50a, 50b rotated 21° relative to one another. From a graph such as shown in FIG. 8, the percent variation in velocity can be determined. The graph shown in FIG. 9 converts percent variation in velocity to equivalent angle. The preferred equivalent angle is one which is exactly equal to the angle of the single Cardan universal joint 5 in the three joint system shown in FIG. 4 and 5. If the equivalent angle of the rotated axes double Cardan universal joint is within approximately 3° degrees of the single Cardan universal joint 5, the velocity variation of the three joint system will be essentially zero.

Having described the invention, what is claimed is:

1. A universal joint, comprising:
  a tubular housing;
  two annular ring yokes pivotally mounted to the tubular housing, each annular ring yoke pivoting about an axis of pivot;
  a first shaft section pivotally mounted to one annular ring yoke; and
  a second shaft section pivotally mounted to the other annular ring yoke;
  the axis of pivot of an annular ring yoke being at right angles to the axis of pivot of the corresponding shaft section, the shaft sections being interengaged by a ball and socket assembly; and
  a stop means for preventing the ball and socket from disengaging, the stop means being comprised of a stop ring on each shaft section, the stop rings contacting the tubular housing prior to the ball disengaging from the socket.

2. The universal joint according to claim 1, further comprising:
  a sleeve within the socket, the sleeve being formed of a self-lubricating material.

3. The universal joint according to claim 1, wherein the ball is integral with one of said first and second shaft sections and the socket is integral with the other of said first and second shaft sections.

4. The universal Joint according to claim 1, further comprising:
  flexible sealing members engaging each shaft section and the tubular housing.

5. A universal joint, comprising:
  a coupling yoke, the coupling yoke having a circular cross-section;
  two trunnion yokes, each trunnion yoke having a circular cross-section and being rotatably connected to the coupling yoke, each trunnion yoke rotating about an axis of rotation, the axis of rotation of one trunnion yoke being parallel to the axis of rotation of the other trunnion yoke;
  an input shaft rotatably connected to one trunnion yoke;
  an output shaft rotatably connected to the other trunnion yoke;
  a ball integral with one of the input and output shafts and a socket integral with the other one of the input and output shafts, the ball and socket being interengaged; and
  a stop means for preventing the ball and socket from disengaging, the stop means comprised of: a stop ring on each shaft, the stop rings contacting the circular coupling yoke prior to the ball disengaging from the socket; the shafts contacting the circular trunnion yokes prior to the ball disengaging from the socket; and one circular trunnion yoke contacting the other circular trunnion yoke prior to the ball disengaging from the socket.

6. The universal joint according to claim 5, further comprising:
  flexible sealing members engaging each shaft and the circular coupling yoke.

7. The universal joint according to claim 5, wherein the circular trunnion yokes rotatable connection includes a bearing member and the shafts rotatable connection includes a bearing member.

8. The universal joint according to claim 7, further comprising:
  a thrust washer between the circular trunnion yokes rotatable connection and the bearing member and a thrust washer between the shafts rotatable connection and the bearing member.

9. A steering column assembly, comprising:

a first shaft;

a second shaft;

a first universal joint connecting the first shaft to the second shaft, the axis of the first shaft being at an angle $\gamma$ to the axis of the second shaft;

a third shaft;

a non-constant velocity double cardan universal joint connecting the second shaft to the third shaft, the non-constant velocity double cardan universal joint comprised of two pivotal second universal joints connected by a connecting yoke, the connecting yoke having an axis extending through the points about which the second universal joints pivot, the axis of one of the second and the third shafts being at an angle $\alpha$ to the connecting yoke axis, the axis of the other of the second and the third shafts being at an angle $\beta$ to the connecting yoke axis, and the non-constant velocity double cardan universal joint having an equivalent angle $\Phi$, defined by $\Phi=\sqrt{\alpha^2-\beta^2}$, $\alpha\neq\beta$, $\alpha>\beta$.

10. The steering column assembly according to claim 9, wherein the connecting yoke has a tubular shape.

11. The steering column assembly according to claim 9, wherein each second universal joint includes an annular ring yoke.

12. The steering column assembly according to claim 9, wherein the connecting yoke has a tubular shape and each second universal joint includes an annular yoke ring.

13. The steering column assembly according to claim 9, wherein the equivalent angle $\Phi$ is equal to the angle $\gamma$.

14. The steering column assembly according to claim 9, wherein the equivalent angle $\Phi$ is no greater than the angle $\gamma$.

15. A steering column assembly, comprising:

a first shaft;

a second shaft;

a first universal joint connecting the first shaft to the second shaft, the axis of the first shaft being at an angle $\gamma$ to the axis of the second shaft;

a third shaft;

a double cardan universal joint connecting the second shaft to the third shaft, the double cardan universal joint comprised of two pivotal second universal joints pivotally connected by a connecting yoke, each second universal joint pivoting about an axis, the pivot axis of one second universal joint being 90° to the pivot axis of the other second universal joint, the connecting yoke having an axis extending through the points about which the second universal joints pivot, the axis of the third shaft being at an angle $\alpha$ to the connecting yoke axis, the axis of the second shaft being at an angle $\beta$ to the connecting yoke axis, and the double cardan universal joint having an equivalent angle $\Phi$, defined by $\Phi=\sqrt{\alpha^2+\beta^2}$.

16. The steering column assembly according to claim 15, wherein the connecting yoke has a tubular shape.

17. The steering column assembly according to claim 15, wherein each second universal joint includes an annular ring yoke.

18. The steering column assembly according to claim 15, wherein the connecting yoke has a tubular shape and each second universal joint includes an annular ring yoke.

19. The steering column assembly according to claim 15, wherein the equivalent angle $\Phi$ is equal to the angle $\gamma$.

20. The steering column assembly according to claim 15, wherein the equivalent angle $\Phi$ is no greater than angle $\gamma$.

21. A steering column assembly, comprising:

a first shaft;

a second shaft;

a first universal joint connecting the first shaft to the second shaft, the axis of the first shaft being at an angle $\gamma$ to the axis of the second shaft;

a third shaft;

a non-constant velocity double cardan universal joint connecting the second shaft to the third shaft, the double cardan universal joint comprised of two pivotal second universal joints pivotally connected by a connecting yoke, each second universal joint having a cross member means for pivotally connecting one of said second and third shafts to the connecting yoke, the one of said second and third shafts pivoting about a shaft pivot axis said cross member means pivoting about a cross member means pivot axis, the shaft pivot axis being at a 90 degree angle to and intersecting the cross member means pivot axis, the cross member means pivot axis of one second universal joint being at an angle $\lambda$ to the cross member means pivot axis of the other second universal joint, angle $\lambda$ being greater than 0° and less than 90°.

22. The steering column assembly according to claim 21, wherein the connecting yoke has an axis extending through the points about which the second universal joints pivot, the axis of the third shaft being at an angle $\alpha$ to the connecting yoke axis, the axis of the second shaft being at an angle $\beta$ to the connecting yoke axis, $\alpha=\beta$.

23. The steering column assembly according to claim 21, wherein the connecting yoke has an axis extending through the points about which the second universal joints pivot, the axis of the third shaft being at an angle $\alpha$ to the connecting yoke axis, the axis of the second shaft being at an angle $\beta$ to the connecting yoke axis, $\alpha\neq\beta$.

24. A universal joint, comprising:

a tubular housing;

two annular ring yokes pivotally mounted to the tubular housing, each annular ring yoke pivoting about an axis of pivot;

a first shaft section pivotally mounted to one annular ring yoke; and a second shaft section pivotally mounted to the other annular ring yoke; the axis of pivot of an annular ring yoke being at right angles to the axis of pivot of the corresponding shaft section, the shaft sections being interengaged by a ball and socket assembly; and a stop means for preventing the ball and socket from disengaging, the stop means comprising one annular ring yoke contacting the other annular ring yoke prior to the ball disengaging from the socket.

25. The universal joint according to claim 24, further comprising:

a sleeve within the socket, the sleeve being formed of a self-lubricating material.

26. The universal joint according to claim 24, wherein the ball is integral with one of said first and second shaft sections and the socket is integral with the other of said first and second shaft sections.

27. The universal joint according to claim 24, further comprising:

flexible sealing members engaging each shaft section and the tubular housing.

* * * * *